United States Patent [19]

Cheslock

[11] Patent Number: 4,473,382

[45] Date of Patent: Sep. 25, 1984

[54] AIR CLEANING AND CIRCULATING APPARATUS

[75] Inventor: Edward P. Cheslock, Oxford, Pa.

[73] Assignee: Lasko Metal Products, Inc., West Chester, Pa.

[21] Appl. No.: 511,915

[22] Filed: Jul. 8, 1983

[51] Int. Cl.³ .............................................. B03C 3/01
[52] U.S. Cl. ...................................... 55/126; 55/131; 55/138; 55/139; 55/154; 55/155; 55/150; 55/484; 422/121; 361/231
[58] Field of Search ..................... 55/6, 103, 124, 126, 55/129, 131, 138, 139, 150, 155, 154, 484; 361/230-232; 422/121

[56] References Cited

U.S. PATENT DOCUMENTS

| | | |
|---|---|---|
| 2,431,724 | 12/1947 | Aydt . |
| 2,625,319 | 1/1953 | Reisch . |
| 2,630,267 | 3/1953 | Ostrognai . |
| 2,652,193 | 9/1953 | Lindberg et al. . |
| 3,716,966 | 2/1973 | De Seversky . |
| 3,747,300 | 7/1973 | Knudson . |
| 3,783,588 | 1/1974 | Hudis . |
| 3,929,436 | 12/1975 | Kim et al. ............... 55/151 |
| 4,069,026 | 1/1978 | Simm et al. ............. 55/6 |
| 4,185,972 | 1/1980 | Nitta et al. ............. 55/155 |
| 4,253,852 | 3/1981 | Adams ................... 55/150 |
| 4,334,766 | 8/1982 | Yavnieli ................. 55/129 |
| 4,339,782 | 7/1982 | Ya et al ................. 55/152 |

FOREIGN PATENT DOCUMENTS 2920813 12/1980 Fed. Rep. of Germany ........ 55/126

Primary Examiner—Bernard Nozick
Attorney, Agent, or Firm—Z. T. Wobensmith, III

[57] ABSTRACT

Air cleaning and circulating apparatus is disclosed, wherein the apparatus is of the hassock fan type with a negative ion generator in the intake air stream to charge particles to be removed, which are then passed over and or through a charged filter which removes them, the air is ionized a second time and discharged for use.

7 Claims, 7 Drawing Figures

AIR CLEANING AND CIRCULATING APPARATUS

BACKGROUND OF THE INVENTION

1. Field of the Invention

This invention relates to an air cleaning and circulating apparatus of the hassock fan type which contains negative ion generators and a charged filter to treat and circulate air.

2. Description of the Prior Art

There are a multitude of devices available that are used to clean and circulate air. One such device uses a high voltage negative ion generator in combination with a positively charged collector plate, the ion generator producing a fountain of ions around the device. As there is no air behind the ions they are not evenly distributed throughout the room and being negatively charged are attracted to walls, rugs and curtains, which are positively charged and therefore cause these areas to become dirty at a rate faster than normal. In addition, the collector plate is inefficient as it does not remove a large portion of the charged particles.

The use of fans of the hassock type to circulate air is well known, such fans are very efficient in high volume air circulation due to their 360° radial air flow at high volume levels which can be in the range of 400 to 600 CFM.

Due to this high volume air movement in hassock fans, filters of the mechanical type in combination with a hassock fan, which would filter 90% of the particles from the air are impractical. The impracticality results from the restriction in discharge air flow that is necessary to provide high efficiency, which restrictions would result in a typical air flow drop from 400 CFM to 100 CFM. This air flow problem would also be apparent in other fan filter configurations due to the flow restrictions necessary to achieve a high level of filtering efficiency.

The U.S. Pat. No. 2,431,724, to Adyt shows a vertical axis fan which has an ozone unit in its base, and which provides for air circulation but does not contain filtering media.

The U.S. Pat. No. 3,747,300, to Knudson shows a portable electrostatic air cleaner with three filter elements, which are a mechanical filter, an electrostatic filter, and an activated charcoal filter, and which also suffers from the problems described above.

The U.S. Pat. No. 3,716,966, to De Seversky illustrates a vertical axis hassock type fan, which is surrounded with a wet electrostatic precipitator, and which provides a complicated structure that requires frequent maintenance, and does not provide the desired high air flow.

The U.S. Pat. No. 3,783,588, to Hudis illustrates the use of an electrostatically charged air filter for air filtration, the filter being provided with openings for air flow and which may be mounted in combination with an axial type fan. The Hudis structure is fragile, complicated and does not provide a high rate of air flow.

The structure of my invention provides for efficient air filtration at a high air flow rate and provides a well distributed stream of negative ions.

SUMMARY OF THE INVENTION

In accordance with the invention, air cleaning and circulating apparatus is provided that includes a hassock type fan, with negative ion generators in the intake air stream, adjacent to a charged filter to attract negatively charged particles in the air, and negative ion generators to provide negative ions in the discharge air stream.

The principal object of the invention is to provide an air cleaning and circulating apparatus which provides a high rate of flow of filtered air.

A further object of the invention is to provide apparatus of the character aforesaid which is simple to construct but sturdy and reliable in operation.

A further object of the invention is to provide apparatus of the character aforesaid that is economical to operate.

A further object of the invention is to provide apparatus of the character aforesaid that operates at low voltages.

A further object of the invention is to provide apparatus of the character aforesaid which provides a stream of negative ions in the discharge air stream that are effectively distributed for beneficial use.

A further object of the invention is to provide apparatus of the character aforesaid which can be used as a fan alone, or in combination as a fan and filtering apparatus.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
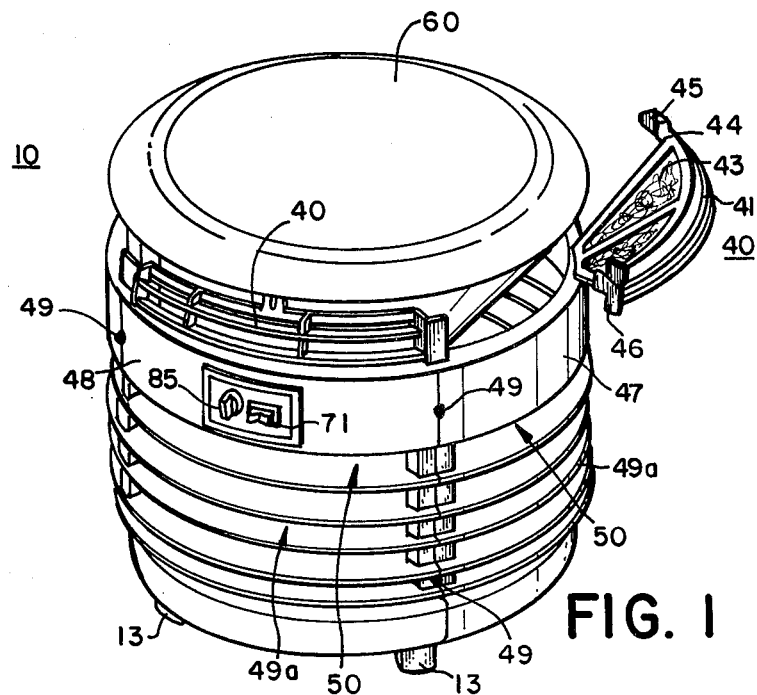
FIG. 1 is a view in perspective of the apparatus of the invention, with a portion removed to show the details of construction.
Figure 2:
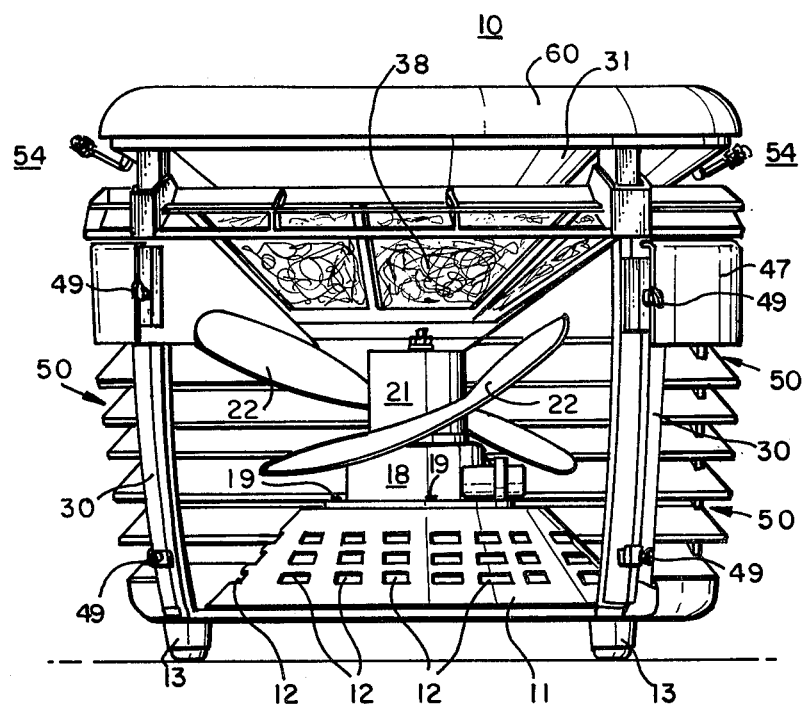
FIG. 2 is a side elevational view of the apparatus of FIG. 1, with a portion removed to show the interior construction.
Figure 3:
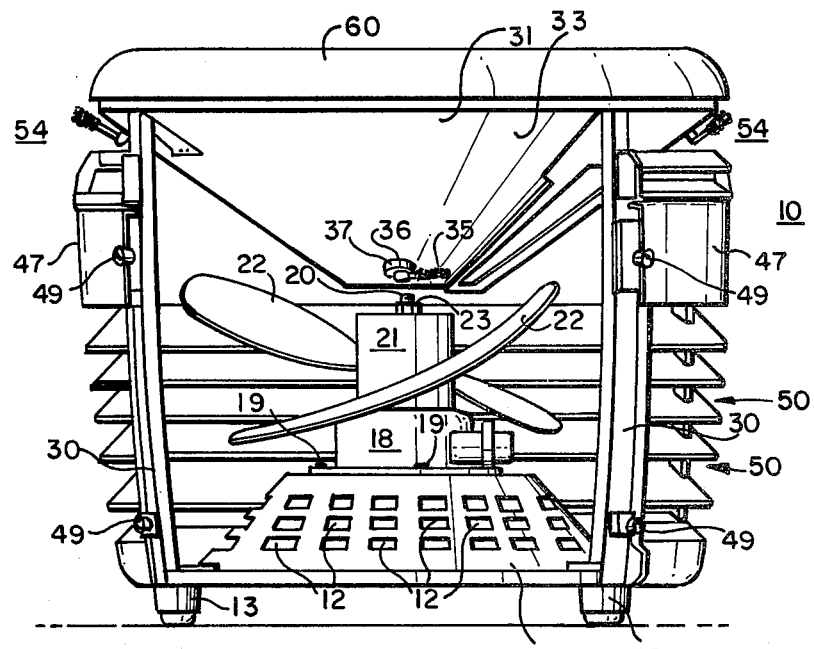
FIG. 3 is a view similar to FIG. 2 with additional portions removed to show additional interior construction details.
Figure 4:
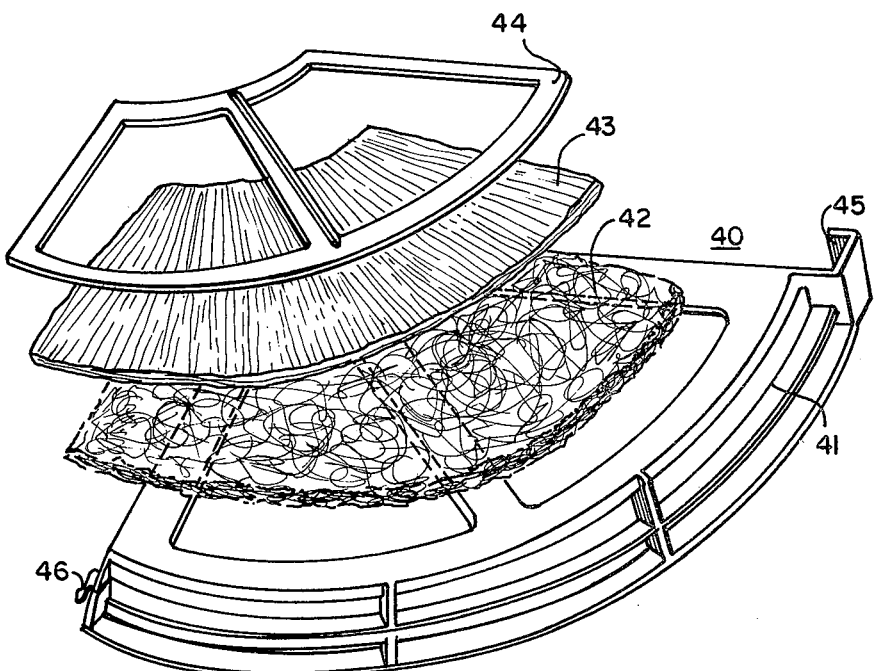
FIG. 4 is an exploded perspective view, enlarged, showing details of the apparatus filter.
Figure 5:
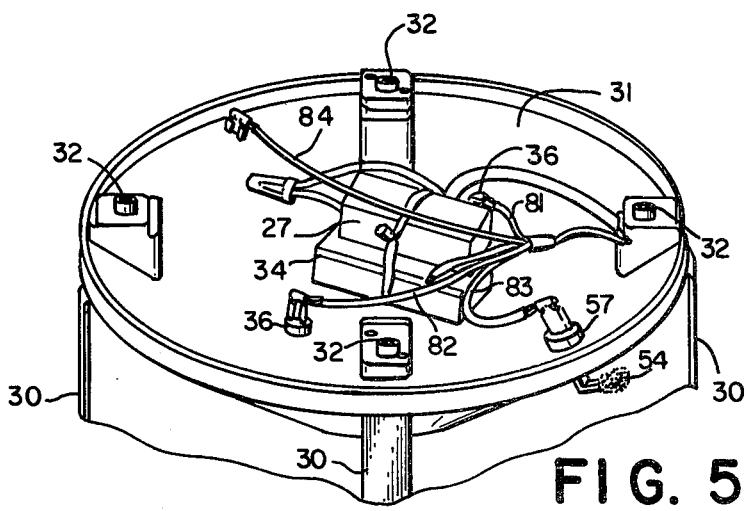
FIG. 5 is a fragmentary perspective view of the apparatus of FIG. 1 with the top removed to show details of the interior construction.
Figure 6:
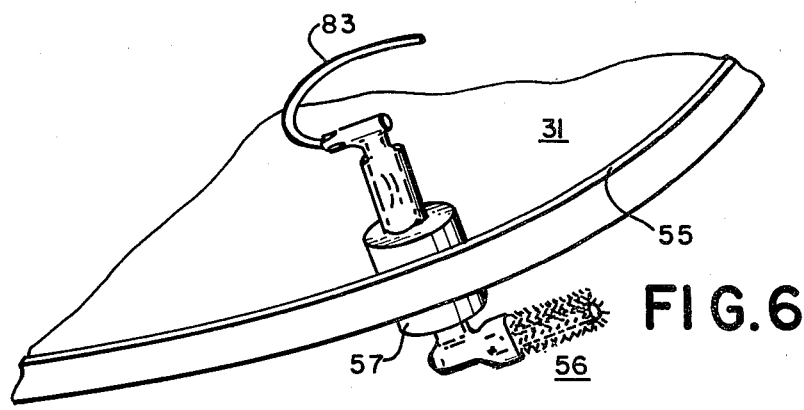
FIG. 6 is a fragmentary perspective view, enlarged, of one of the ion generators of the apparatus.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 6 thereof, the apparatus 10 of the invention is there illustrated, and includes, a base 11 of circular raised dish shape, with slots 12 therethrough, and which is provided with a plurality of feet 13, four being shown to raise it off the floor (not shown) and permit air to flow through slots 12.

The base 11 has an electric motor 18 of well known type mounted thereto by bolts 19 and has a shaft 20 extending vertically upwardly with a fan 21 mounted thereto by retainer 23, and which fan 21 has blades 22. The motor 18 is connected to wire 28 and by wires (to be described) to a speed reduction device 27 of well known type.

The base 11 has vertical ribs 30 attached thereto around it periphery above and at feet 12 by screws (not shown), four ribs being shown, which have a cone 31 attached thereto at the top by bolts 32. The cone 31 has the speed reduction device 27 and a power supply 34 secured thereto in well known manner.

The cone 31 has two negative ion generators 36 attached thereto on opposite sides adjacent the center thereof on the underside 33 of cone 31, which include ion emitter heads 35 of well known type, and which are engaged in grommets 37 mounted in the cone 31.

The negative ion generators 36 are upstream of a filter 38 which filter includes a plurality of filter packs 40, four being shown.

The filter packs 40 are of segmented configuration each with a frame 41, a foam pre-filter 42 of well known type, an electrically charged filter element 43 and a retainer 44.

The charged filters 43 as illustrated are of the electrete or pre-charged type available from Minnesota Mining and Manufacturing Co. (3M), Minneapolis, Minn.

The filter 43 can also be of the type that is naturally positively charged, with an uninduced charge so that negatively charged particles are attracted to it. If desired the filter element 43 could be of the conductive charge type made from materials such as carbonized foam, or metal screen to which a charge is applied during operation and which would provide a filter with greater particle attraction and which is washable. The charged filter 43, as illustrated, must be periodically checked and replaced by the user when it becomes dirty. The frames 41 of filter packs 40 each has a hook 45, and a snap member 46 to engage adjacent ribs 30 for retention thereto.

The ribs 30 have side panels 47 and 48 engaged therewith and retained thereto by screws 49. The base 11, ribs 30, cone 31 and side panels 47 and 48 are of molded plastic construction. The side panels 47 and 48 have ribs 49a with slots 50 therebetween to permit air to pass into the interior of apparatus 10. The panels 47 and 48 can be detached from ribs 30 to permit access to the interior of apparatus 10 by removing the screws 49, as desired.

The cone 31 on the underside 33 has an additional pair of negative ion generators 54 mounted thereto on opposite sides thereof adjacent outermost rim 55 of cone 31 but downstream of filter 38 in the discharge air stream. The generators 54 include ion emitter heads 56 of well known type, which are engaged in grommets 57 mounted in the cone 31.

The apparatus 10 also includes a top panel 60 which fits over the cone 31 and is secured thereto in well known manner.

Figure 7:
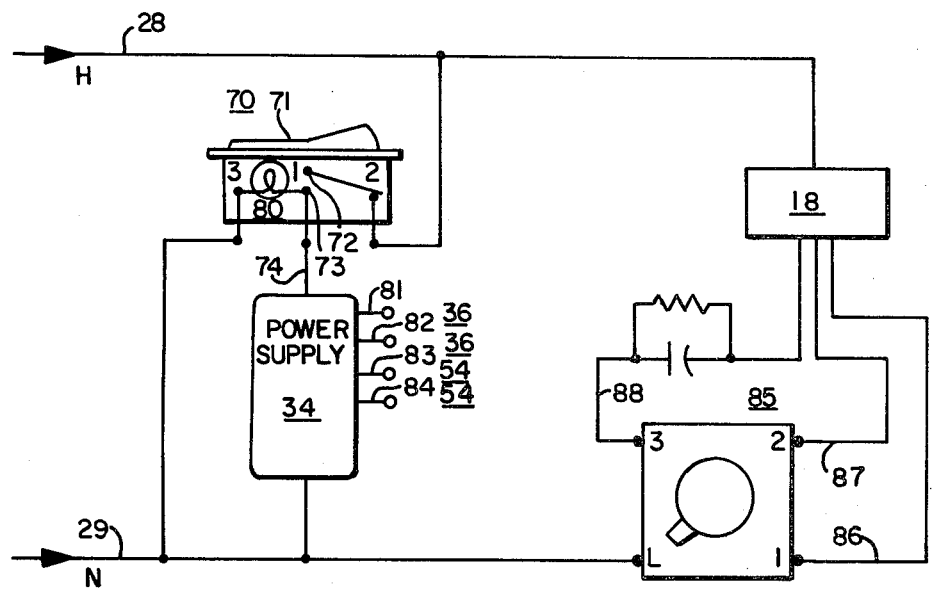
FIG. 7 is an electrical circuit diagram illustrating the electrical circuitry associated with the apparatus of the invention.

Referring now also to FIG. 7, the circuit diagram includes wires 28 and 29 connected to a source of electrical power (not shown), wire 28 is also connected to an on-off switch 70 of well known type which has a rocker 71 to close a circuit through contacts 72 and 73, and through wire 74 provides electrical power to the power supply 34 which is connected to wire 29.

The switch 70 has a lamp 80 of well known type therein also activated by closing of contacts 72 and 73. The power supply 34 has wires 81, 82, 83 and 84 attached thereto, wires 81 and 82 extending to the upstream negative ion generators 36, and wires 83 and 84 extending to the downstream negative ion generators 54.

The speed reduction device 27 includes a multi-position switch 85, with three positions shown, respectively connected by wires 86, 87 and 88 to the motor 18 in well known manner.

The mode of operation will now be pointed out.

When it is desired to use the device as a fan only, the speed is selected by adjusting switch 85 and motor 18 will operate, turning fan 21 with air drawn in through the side slots 50 and through slots 12 in base 11. The air passes upwardly through the filter packs 40 and some filtration is achieved by foam prefilter 42 and filter 43 before the air is discharged between the top 60 and the side panels 47 and 48.

When it is desired to utilize the ionization feature, the switch 70 is activated so that electrical power from power supply 34 causes the ion generators 36 and 54 to emit negative ions. The air drawn in through the slots 12 and side slots 50 of panels 47 and 48, is ionized upstream of filter 37 by ion generators 36 and the air and negatively charged particles are passed through filter packs 40 where the negatively charged particles are attracted to the charged filter 43, retained thereon and relatively particle free air is discharged with the ion emitters 54 placing negative ions in the discharge air stream.

Tests have shown that because of the placement in the air stream of the filter 38 and the use of ionization generators 36 upstream of the pre-charged filter 43 there is much less air loss than if 100% of the air were drawn through the filter 43. This results, as air is drawn over, as well as through the filter 38, and particles are removed from the air through electrical attraction both as they pass over and through the filter. Tests have shown filtration is 40% efficient on particles down to 0.5 microns in size, and with a total air delivery of 400 CFM, the clean air delivery is approximately 160 CFM. The air is refiltered approximately 5 times an hour in an average sized room. Testing has also shown that in a 1700 cubic foot room contaminated with 0.5 micron particles, 96.8% were removed in the first 30 minutes and 99.9% after one hour. It has also been determined that because of the improved circulation of the negative ions, power supply voltages can be reduced without effecting particle removal ability. Higher voltage ion generators tend to have more problems with soiling walls and furniture, and tend to produce a "static shock" to someone touching the emitters or the air cleaner. In addition, ozone emissions are less likely with lower voltages. The tests have also shown that output voltages of less than 10 kilovolts in this configuration can effectively clean the air, with most ion generators available in the market producing upwards of 15 kilovolts.

It should also be noted that the prefilters 42 can be removed and washed as desired to remove particles retained therein, and that the positively electrically charged filter element 43 can also be easily replaced when desired.

It will thus be seen that structure has been provided with which the objects of the invention are achieved.

I claim:

1. Air cleaning and circulating apparatus of the hassock fan type which includes
   a dish shaped base,
   an electric motor mounted to said base,
   a shaft extending vertically upwardly from said motor,
   a fan mounted to said shaft,
   a plurality of vertically extending ribs mounted to said base,
   a plurality of panels detachably mounted to said ribs,
   said panels being provided with air intake slots therein,
   a cone mounted to said ribs at the top,
   a top panel detachably mounted to said cone spaced upwardly from said panels,
   at least one negative ion generator mounted to said cone adjacent the center thereof,
   a filter mounted to said cone adjacent said ion generator in the path of air from said fan, and
   at least one negative ion generator mounted to said cone on the opposite side of said filter from said first mentioned ion generator.

2. Air cleaning and circulating apparatus as defined in claim 1 in which
   said electric motor is provided with speed control means.

3. Air cleaning and circulating apparatus as defined in claim 1 in which
   said filter includes a filter element which carries an un-induced positive electrical charge.

4. Air cleaning and circulating apparatus as defined in claim 1 in which
   said filter includes a removable pre-filter.

5. Air cleaning and circulating apparatus as defined in claim 4 in which
   said filter includes an electrically charged filter element.

6. Air cleaning and circulating apparatus as defined in claim 5 in which
   said electrically charged filter element is pre-charged.

7. Air cleaning and circulating apparatus as defined in claim 5 in which
   said electrically charged filter element is electrically conductive.

* * * * *